United States Patent [19]

Long

[11] 3,726,047
[45] Apr. 10, 1973

[54] MOTOR DRIVEN KNIFE GRINDER FOR FORAGE HARVESTER CUTTERS

[75] Inventor: William D. Long, Hesston, Kans.

[73] Assignee: Hesston Corporation, Hesston, Kans.

[22] Filed: May 24, 1971

[21] Appl. No.: 146,144

[52] U.S. Cl. .................................. 51/249, 51/241 S
[51] Int. Cl. ..................................... B24b 3/42
[58] Field of Search ............... 51/48 HE, 95 LH, 51/241 S, 246, 247, 249

[56] References Cited

UNITED STATES PATENTS

| | | | |
|---|---|---|---|
| 3,581,446 | 6/1971 | Witt | 51/249 |
| 1,820,777 | 8/1931 | Calhoun | 51/249 |
| 2,318,865 | 5/1943 | Johnson | 51/95 LH X |

*Primary Examiner*—Donald G. Kelly
*Assistant Examiner*—Gary L. Smith
*Attorney*—Schmidt, Johnson, Hovey & Williams

[57] ABSTRACT

The beveled edges of the spiral blades of a reel cutter are sharpened by advancing a rotatable grinder therealong as the reel is advanced at the same time, all through use of but a single, crank operated drive shaft. Power is transmitted from the crank to a shiftable support for the grinder through a pair of operably interconnected chain and sprocket wheel units. Power is also transmitted from the crank to the reel through a worm and worm gear arrangement, a pair of levers, an indexing assembly on the driven shaft of the reel and an adjustable link between the levers.

2 Claims, 7 Drawing Figures

PATENTED APR 10 1973

INVENTOR.
William D. Long

BY

Schmidt, Johnson, Hovey & Williams
ATTORNEYS.

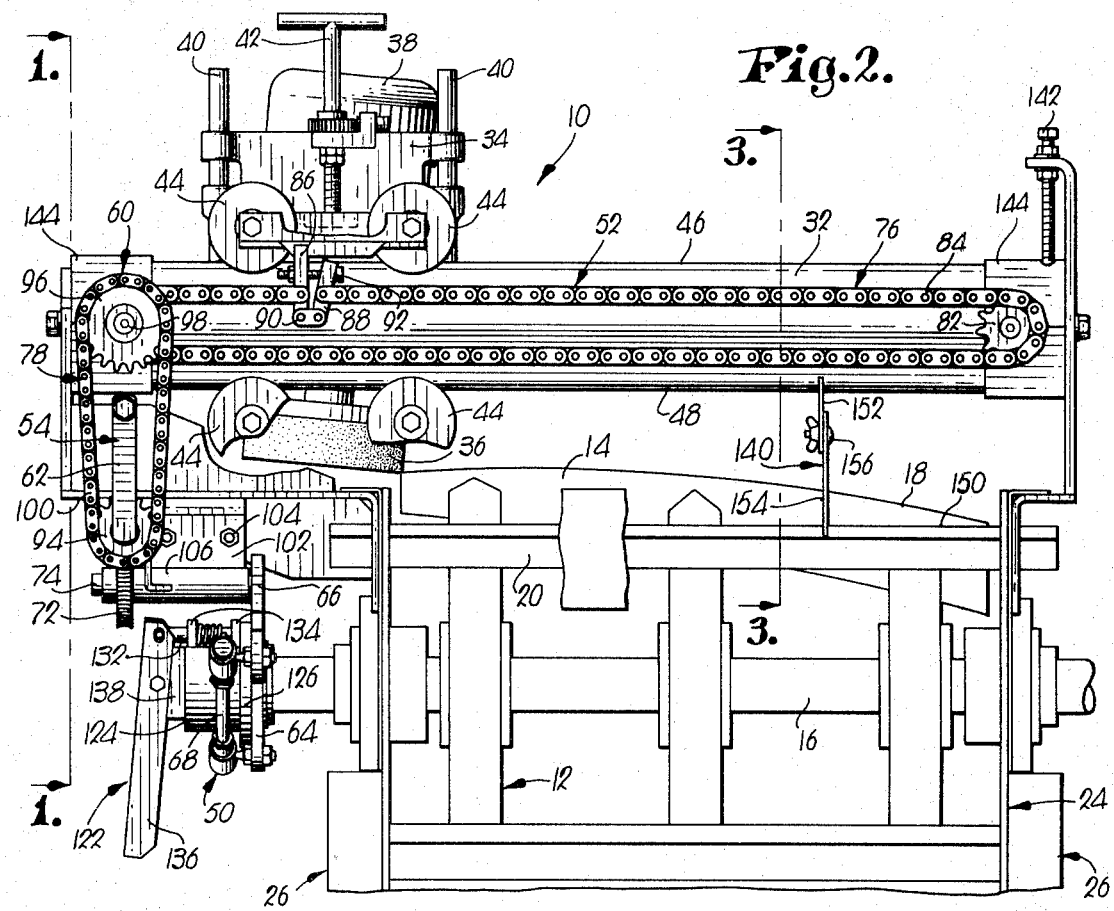
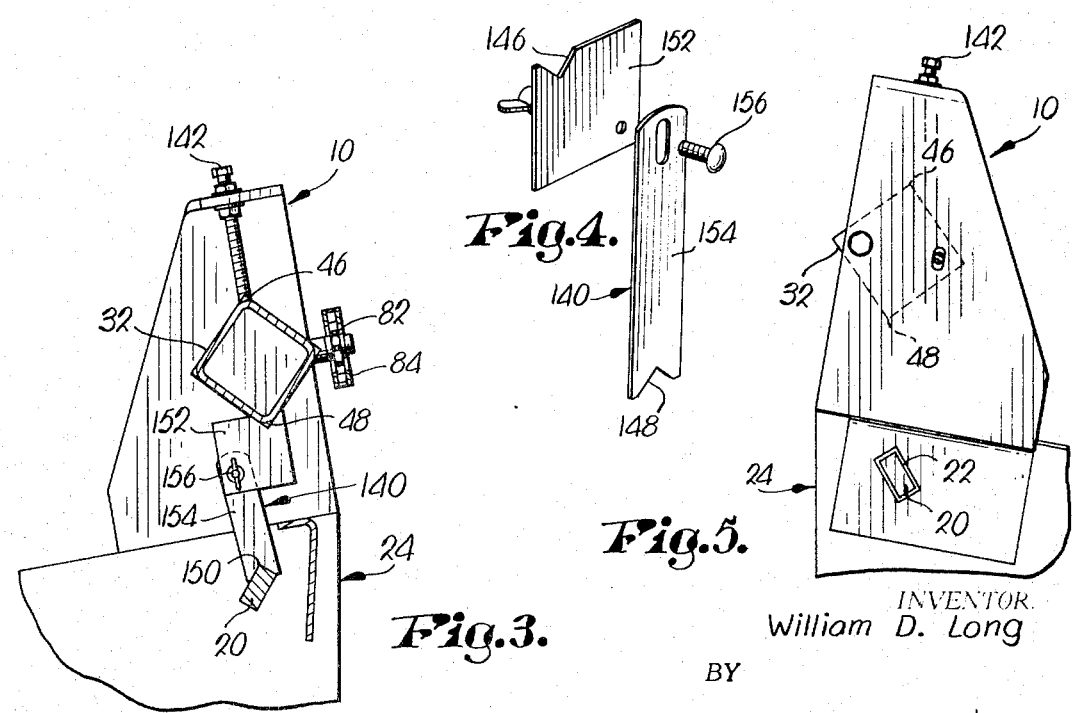

MOTOR DRIVEN KNIFE GRINDER FOR FORAGE HARVESTER CUTTERS

An important object of my present invention is to provide apparatus for sharpening the beveled edges of the spiral blades of a reel-type cutter wherein by simply turning a manual crank power is not only transmitted to advance a grinder along one of the blades, but is transmitted to advance the reel about its axis of rotation during the sharpening operation.

Another important object of the instant invention is the provision of power transmitting mechanisms which eliminate the need for arrangements that advance the reel as a function of the advancement of the grinder.

Still another important object of the present invention is to drive both the reel and the grinder support directly from the crankshaft so that there is no need for a high precision and expensive drive for the reel from the grinder support as has heretofore been suggested.

In the drawings:

FIG. 2 is a front elevational view thereof taken on line 2—2 of FIG. 1;

FIG. 3 is a detailed cross-sectional view taken on line 3—3 of FIG. 2;

FIG. 4 is an exploded perspective view on an enlarged scale of the gauge shown in FIG. 2;

FIG. 5 is a fragmentary elevational view of the opposite end of the apparatus;

Figure 1:
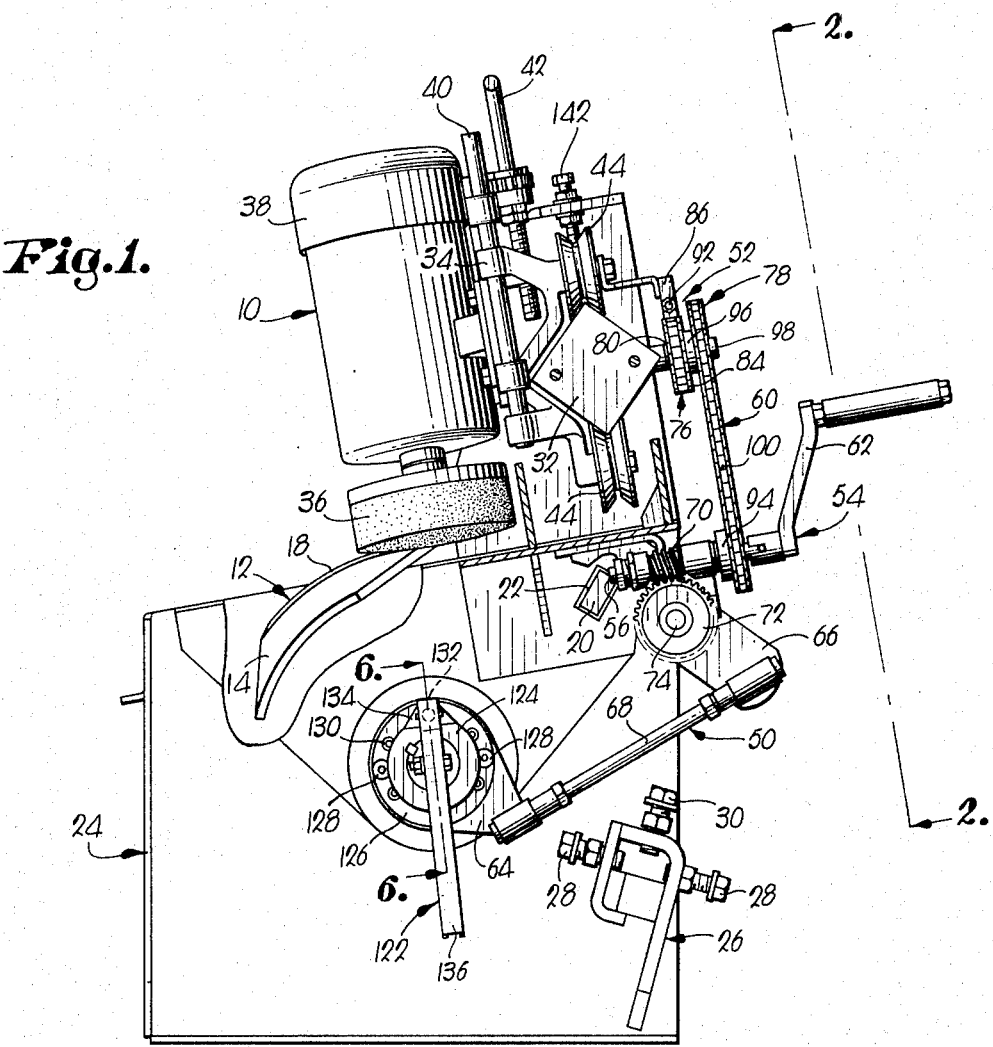
FIG. 1 is an end elevational view of a motor driven knife grinder for forage harvester cutters made in accordance with my present invention taken along line 1—1 of FIG. 2.
Figure 6:
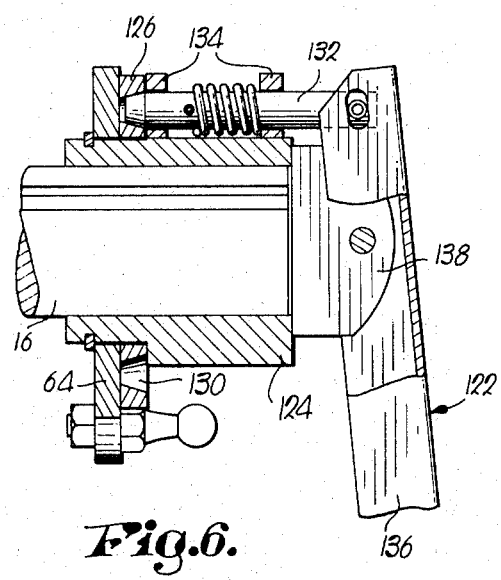
Figure 7:
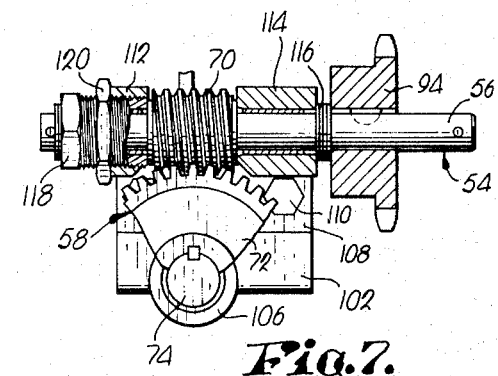

FIG. 6 is an enlarged, fragmentary, detailed cross-sectional view taken on line 6—6 of FIG. 1; and FIG. 7 is an enlarged, fragmentary, detailed view similar to FIG. 1, parts being broken away and in section to reveal details of construction, illustrating the crankshaft and a portion of the mechanism for transmitting power to the reel as well as the mechanism for transmitting power to the grinder support.

The blade sharpening apparatus 10 shown in the drawings is used in connection with a reel cutter 12 of a forage harvester in which a plurality of spiral blades 14 are mounted on the driven shaft 16 of the cutter 12 and the beveled edges 18 of blades 14 cooperate in their cutting actions with a stationary, tangential shear bar 20 as cutter 12 revolves relative to the bar 20. While bar 20 is shown temporarily disposed horizontally within openings 22 of apparatus 10, parallel with its operating position, it normally traverses cutter housing 24 of the harvester within opposed brackets 26, the latter of which each have a pair of adjusting bolts 28 and a locking bolt 30.

Apparatus 10 is mounted on the housing 24 and includes guide means 32 disposed above and in spaced parallelism with bar 20, a support 34 shiftable along the guide means 32 and a rotatable grinder 36 driven by an electric motor 38 reciprocable along rods 40 forming a part of support 34. Grinder 36 is adjusted toward and away from edges 18 by turning a T-bolt 42 that interconnects motor 38 and support 34. Two pairs of grooved wheels 44 on support 34 roll along upper and lower edges 46 and 48 respectively of transversely polygonal guide rail 32.

Power means for simuntaneously shifting the support 34 along the guide bar 32 and revolving the cutter 12 as grinder 36 is rotated by motor 38 to sharpen edge 18 of one of the blades 14 includes a first assembly 50 connected with shaft 16 to revolve cutter 12 as assembly 50 is actuated, and a second assembly 52 connected with support 34 to shift the latter along bar 32 as assembly 52 is actuated.

Drive structure 54 includes a single, rotatable drive shaft 56 common to assemblies 50 and 52 and to a first and a second power transmitting mechanism 58 and 60 respectively. Structure 54 also includes a crank 62 removably attached to shaft 56 for rotating the latter.

The assembly 50 includes a first swingable lever 64 which may be releasably connected to shaft 16, a second swingable lever 66 and an extensible link 68 pivotally interconnecting levers 64 and 66. Mechanism 58 includes a worm 70 coupled with shaft 56 and a worm gear 72 in mesh with worm 70. Lever 66 and gear 72 are secured to a jackshaft 74 in spaced relationship.

The assembly 52 includes a first chain and sprocket wheel unit 76 operably connected with the support 34 whereas the mechanism 60 includes a second chain and sprocket wheel unit 78 operably coupled with unit 76 and with the shaft 56.

The unit 76 is provided with a pair of sprocket wheels 80 and 82 rotatably carried by the bar 32 and having a chain 84 trained therearound. A tightener within chain 84 includes a pair of arms 86 and 88 pivotally connected by a link 90 and a take-up bolt 92, the arm 86 being rigidly attached to support 34.

The unit 78 is provided with a pair of sprocket wheels 94 and 96 secured to shafts 56 and 98 respectively, the latter being common to the sprocket wheel 80. A chain 100 is trained around sprocket wheels 94 and 96.

A bracket 102 attached to apparatus 10 by bolts 104 has a tube 106 parallel with shaft 16 which receives the shaft 74. A plate 108 attached to bracket 102 by bolts 110 has two bushing receiving tubes 112 and 114 through which shaft 56 passes, across and over the top of shaft 74. Worm 70 is keyed to shaft 56 between tubes 112 and 114 and washers 116 are placed on the shaft 56 between tube 114 and sprocket wheel 94. A tubular take-up nut 118 on shaft 56 threaded into tube 112 is held in place by lock nut 120 thereon bearing against tube 112.

An indexing assembly 122 removably mounted on shaft 16 includes a hub 124 surrounding shaft 16 and keyed thereto. Lever 64 and an indexing plate 126 surround the hub 124 and are interconnected by diametrically opposed bolts 128. Holes 130 in plate 126 corresponding to blades 14 selectively receive a spring-loaded pin 132 carried by ears 134 on hub 124. A handle 136 is swingably supported by an ear 138 or hub 134 and is pivotally connected to pin 132.

Prior to sharpening of blades 14 bar 20 is removed from brackets 26 and inserted into openings 22 as aforementioned. Thereupon, a gauge 140 is interposed between the bars 20 and 32 and bolt 142 adjusted to bring the bars 20 and 32 into parallelism. Bar 32 is supported by end caps 144 and by bolt 142 for swinging movement toward and away from bar 20 as bolt 142 is manipulated. Gauge 140 has opposed notches 146 and 148 which receive edge 48 of bar 32 and edge 150 of bar 20. Gauge 140 has two parts 152 and 154 which may be adjusted by loosening of a bolt 156.

OPERATION

After adjustment of the guide bar 32 through use of the gauge 140, the bolt 142 is locked in place and the bar 20 may then be removed from the openings 22. The hub 124 may then be slipped onto the shaft 16 and the sharpening apparatus 10 is then ready for use after energization of the motor 38 to continuously rotate the grinder 36. The pin 132 is within one of the openings 130 corresponding to the first blade 14 to be sharpened.

Crank 62 is then manipulated to rotate the shaft 56, causing rotation of the sprocket wheel 94, and therefore the sprocket wheel 96 through the chain 100. This rotates the shaft 98 and the sprocket wheel 80 to drive the chain 84 as it rotates the idler sprocket wheel 82.

The arm 86 moves from left to right viewing FIG. 2, carrying therewith the support 84 as the wheels 44 roll along the edges 46 and 48 of the guide bar 32. The motor 38 and the grinder 36 advance with the support 34 and the rotating grinder 36, in engagement with the beveled edge 18 of the proximal blade 14 sharpens such edge 18 during the movement of the support 34 toward the bolt 142.

At the same time, rotation of the crankshaft 56 transmits a swinging action to the lever 66 through the worm 70 and the gear 72, such swinging of the lever 66 being transmitted to a similar motion in the lever 64 through the connecting link 68.

Power is transmitted from the lever 64 to the indexing plate 126 through the bolts 128, plate 126 transmitting power in turn to the pin 132, the hub 124 and the shaft 16 to continuously advance the cutter 12 about the axis of its driven shaft 16. Consequently the edge 18 is progressively advanced so that it is held in proper engagement with the rotating grinder 36 throughout the time it moves toward the bolt 142.

Sharpening of the next blade 14 is accomplished in the same manner after first repositioning the pin 132 in another of the holes 130. This is accomplished by depressing the handle 136 to withdraw the pin 132, whereupon the handle 136 is turned to rotate the hub 124, and therefore the driven shaft 16 with respect to the lever 64 and the indexing plate 126. Handle 136 is then released to reposition the pin 132 in the next succeeding hole 130. Such reindexing of the assembly 122 places the next succeeding blade 14 in proper relationship to the grinder 36.

After the grinding operation is complete, the shear bar 20 is repositioned in the brackets 26, the bolts 28—28 are manipulated to adjust the bar 20 properly with respect to the cutting edges 18 and shear bar 20 then again clamped and locked in place by use of the bolts 30 of the brackets 26. Hub 124 is then removed from the shaft 16 and the harvester is again ready for use.

It is now apparent from the foregoing that the advancement of the support 34 and the advancement of the cutter 12 take place by virtue of the two separate power transmitting mechanisms 58 and 60 common to the crankshaft 56, all of which is to be distinguished from power means operably interconnecting the support 34 and the reel cutter 12 for the purpose of advancing the latter as a consequence of the movement of the support 34. As above indicated, such advancement of the cutter as a consequence of and in response to the advancement of the grinder support has heretofore been suggested but the operable interconnection between the support and the cutter has been rather complicated, expensive and subject to the requirement of high precision manufacture and adjustment. The use of but a single crank driven shaft for accomplishing all of the desired movements and operations as above described has the decided advantage of simplicity, ease of manufacture and operation and long life without danger of malfunction or necessitating periodic readjustment, particularly after long use and consequent wearing away of component parts.

Having thus described the invention, what is claimed as new and desired to be secured by Letters Patent is:

1. Apparatus for sharpening the beveled edges of a plurality of spiral blades mounted on the driven shaft of a reel cutter wherein said edges normally cooperate in their cutting actions with a stationary, tangential shear bar as the cutter revolves relative to the bar, said apparatus including guide means disposed in spaced parallelism with said bar, a support shiftable along said guide means, and a grinder carried by said support, the improvement of which comprises power means for simultaneously shifting the support and revolving the cutter as the grinder sharpens the edge of one of said blades, said power means including:
   a first assembly for revolving the cutter as said first assembly is actuated including a driven shaft, a first swingable lever connected with said driven shaft, a second swingable lever operably connected with said cutter, and a link pivotally interconnecting the levers;
   a second assembly connected with said support for shifting the latter as said second assembly is actuated including a first chain and sprocket wheel unit operably connected with the support;
   a drive shaft;
   a first power transmitting mechanism operably coupling said driven shaft with said drive shaft;
   a second power transmitting mechanism including a second chain and sprocket wheel unit operably coupled with said drive shaft;
   means operably interconnecting said first mechanism and said driven shaft of the first assembly for actuating the latter to revolve the cutter as said drive shaft is operated; and
   means operably interconnecting said second chain and sprocket unit of the second mechanism and said first chain and sprocket unit of the second assembly for actuating the latter to shift the support simultaneously with revolution of the cutter as said drive shaft is operated.

2. Apparatus as claimed in claim 1 wherein said first mechanism includes a worm coupled with said drive shaft and a worm gear coupled with said driven shaft in mesh with said worm.

* * * * *